Nov. 11, 1941.     W. A. HARRISON     2,262,458
ELECTRICAL SIGNALING OR CONTROL SYSTEM
Filed March 19, 1938
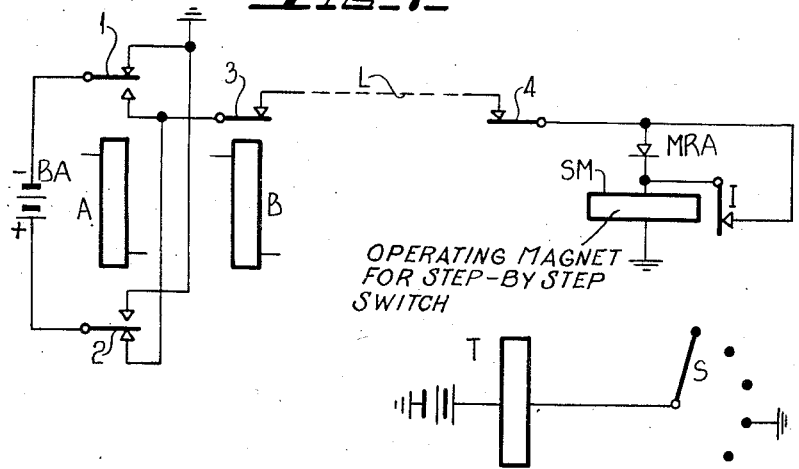
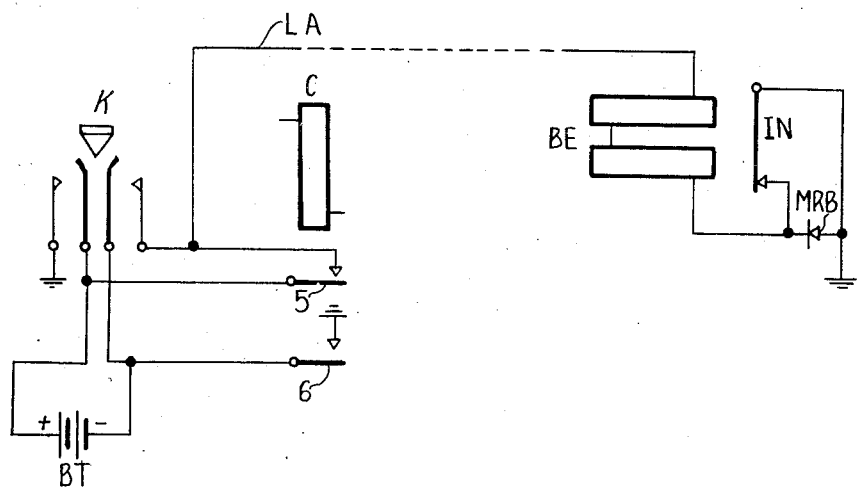
INVENTOR
WILLIAM ARTHUR HARRISON
ATTY.

Patented Nov. 11, 1941

2,262,458

UNITED STATES PATENT OFFICE 2,262,458

ELECTRICAL SIGNALING OR CONTROL SYSTEM

William Arthur Harrison, Liverpool, England, assignor to Associated Telephone & Telegraph Company, Chicago, Ill., a corporation of Delaware Application March 19, 1938, Serial No. 196,850
In Great Britain April 21, 1937

7 Claims. (Cl. 175—320)

The present invention relates to electrical signaling or control systems and particularly to the distant control of electromagnetic devices which are arranged to operate by self-interrupted action from a source of direct current electric supply. The invention is moreover particularly applicable to the distant control of electromagnetic trembler bells and of pawl and ratchet electromagnetic switching mechanisms such as are commonly used in light current electrical engineering.

The chief object of the invention is to provide an improved arrangement whereby an electromagnetic device may be simply controlled over a single circuit in such a manner that it may operate either by self-interrupted action or in response to one or more separate impulses.

According to the invention, in an electrical signaling or control system employing an electromagnetic responding device arranged to operate contacts to open its energising circuit, the contacts are shunted by a rectifier so that their opening will be effective or not according to the direction of the operating current.

The invention will be better understood from the following description of two possible applications which should be taken in conjunction with the accompanying drawing comprising Figs. 1 and 2. Of these, Fig. 1 shows the invention applied to pawl and ratchet switching mechanisms of the type used in automatic telephone systems, while Fig. 2 shows the invention applied to a trembler bell.

Referring first to Fig. 1, use is made of a step-by-step switching device operated through pawl and ratchet mechanism by a magnet SM and having a set of wipers arranged to move over bank contacts, only the wiper S being shown. It is assumed that this switch is controlled from a distant point over a single lead, the return circuit being by way of earth. This necessarily means that the battery or other source of supply must not have one pole permanently earthed and if this requirement could not be fulfilled it would be necessary to employ a separate return lead.

With the equipment in the position shown a circuit is provided for the magnet SM from earth over armature 1 of relay A, battery BA, armature 2 of relay A, armature 3 of relay B, over line L, armature 4 of relay T and by way of the interrupter contact I, winding of magnet SM to earth. It will be noticed that the interrupter contact I is shunted by the rectifier MRA and it will be assumed that with current flow in this direction the rectifier is conducting. Accordingly the magnet SM operates and opens its interrupter contacts but it remains energised as current still flows by way of the rectifier. In these circumstances it may be convenient to effect the setting of the switch S by intermittent operation of relay B.

When relay B operates, armature 3 will open the above traced circuit, magnet SM will be de-energised and if the switch is of the reverse drive type the wiper S will be advanced one step. When relay B is de-energised, armature 3 will again close the circuit and cause the re-energisation of magnet SM which therefore attracts its armature preparatory to advancing the wipers a further step.

In case, however, the switch S is required to perform a self-interrupted hunting movement rather than to respond to the impulsive operation of relay B, relay A will be energised, thereby reversing the connections of the battery BA to the line. In these circumstances the rectifier MRA will be non-conductive and consequently the opening of the interrupter contacts I will serve to de-energise the magnet SM and thus permit the step-by-step advancement of the wipers. In this case it might be arranged that relay T was energised by earth encountered when wiper S reached a particular contact and thereupon by opening its armature 4 brought the switch to rest.

Referring now to Fig. 2, this shows the application of the invention to a bell of the ordinary trembler type which can be arranged to operate as a trembler bell for instance for alarm purposes or as a single stroke code signaling bell.

It is again assumed that the operation takes place over a single lead with earth return though obviously two leads could be employed if circumstances made it desirable. In this case it will be assumed that if relay C is operated when an alarm is to be given, the circuit then completed from earth over armature 6, battery BT, armature 5, line LA, bell BE, and interrupter contacts IN to earth, is such that the rectifier MRB which shunts the interrupter contacts IN is non-conductive. In this case the bell will operate as an ordinary trembler bell and ring continuously as long as the circuit is closed. For signaling purposes, however, use is made of the key K and when this is pressed the battery is connected in circuit in the opposite sense so that the rectifier MRB is conductive. In this case the opening of the interrupter contacts IN is without effect and the bell will give a single stroke for each operation of the key K. By the use of an arrangement of this type the cost of combined bell signaling and alarm systems suitable for use in mines or the like is appreciably reduced since two conductors only are required and one bell can serve two purposes.

It will be understood that the above described applications are given by way of example only, and that the invention is not limited to the precise arrangements suggested.

I claim:

1. In combination, a circuit, means for causing direct current to flow in said circuit, means for reversing the direction of current flow in said circuit, an electromagnetic device in said circuit, and means for causing said device to be operated continuously or intermittently during the flow of said current in said circuit in dependence upon the direction of said current flow.

2. In combination, a circuit, means for transmitting direct current impulses of different polarity over said circuit, an electromagnetic device in said circuit, and means in said circuit to cause said device to be operated continuously during each impulse of current in one direction and for causing said device to be operated intermittently during each impulse of a different polarity.

3. In combination, a circuit, means for causing direct current to flow in said circuit in one direction, means for reversing the direction of current flow in said circuit, an electromagnetic device energized by current received over said circuit in either direction, a contact operated to open said circuit responsive to each operation of said device, and means, effective only if the current flowing over said circuit is in said one direction, to maintain said device operated after said operation of the contact.

4. In combination, a circuit, a source of current therefor, an electromagnetic device energized over said circuit, a contact controlled by said device to open said circuit responsive to the energization of said device, and a rectifier shunting said contact to maintain said device energized independently of said contact if the current over said circuit is in a particular direction.

5. In a combination as claimed in claim 4, means for interrupting the flow of current over said circuit one or more times in succession when said current flow is in said particular direction.

6. In combination, a circuit, a source of current therefor, a device operated by current received over said circuit from said source, a contact in said circuit for opening same responsive to the operation of said device, a rectifier connected in shunt with said contact to maintain said device operated so long as current continues to flow over said circuit if said current is in a particular direction, and means for reversing the direction of current flow in said circuit thereby to cause said device to operate self-interruptedly.

7. In combination, a contact, an electromagnetic device for operating said contact, a circuit extending to said device over said contact, a rectifier bridging said contact, means for sending current impulses of one polarity over said circuit, said device energized over said contact responsive to each impulse and maintained energized throughout each impulse over said rectifier, and means for sending current of a different polarity over said circuit to cause the device to operate self-interruptedly.

WILLIAM ARTHUR HARRISON.